United States Patent
Kanemoto et al.

(10) Patent No.: US 6,745,035 B2
(45) Date of Patent: Jun. 1, 2004

(54) COMMUNICATION TERMINAL APPARATUS AND TRANSMISSION METHOD OF INFORMATION NECESSARY FOR COMMUNICATION USING A DOWNLINK SHARED CHANNEL (DSCH)

(75) Inventors: Hideki Kanemoto, Yokosuka (JP); Kazuyuki Miya, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/049,523
(22) PCT Filed: Jun. 25, 2001
(86) PCT No.: PCT/JP01/05392
§ 371 (c)(1), (2), (4) Date: Feb. 13, 2002
(87) PCT Pub. No.: WO01/99453
PCT Pub. Date: Dec. 27, 2001

(65) Prior Publication Data
US 2003/0008655 A1 Jan. 9, 2003

(30) Foreign Application Priority Data
Jun. 23, 2000 (JP) .................. 2000-189410

(51) Int. Cl.$^7$ .................. H09Q 7/20
(52) U.S. Cl. .................. 455/450; 455/423; 455/511; 370/330; 370/337
(58) Field of Search .................. 455/450, 403, 455/407, 408, 414, 420, 422, 464, 509, 510, 511, 515, 423; 370/320, 321, 330, 347, 337, 286

(56) References Cited

U.S. PATENT DOCUMENTS 5,210,752 A  * 5/1993  Ito et al. .................. 370/337
5,355,514 A  * 10/1994  Borg .................. 455/423

(List continued on next page.)

FOREIGN PATENT DOCUMENTS

| EP | 594342 A2 | * 4/1994 | ......... H04Q/7/04 |
|---|---|---|---|
| EP | 0713300 | 5/1996 | |
| EP | 0765096 | 3/1997 | |
| JP | 11069431 | 3/1999 | |
| JP | 11234738 | 8/1999 | |
| JP | 11239152 | 8/1999 | |
| JP | 2000115861 | 4/2000 | |
| WO | 9965158 | 12/1999 | |

OTHER PUBLICATIONS

International Search Report dated Sep. 11, 2001.

(List continued on next page.)

*Primary Examiner*—Cong Van Tran
(74) *Attorney, Agent, or Firm*—Stevens, Davis, Miller & Mosher, LLP.

(57) ABSTRACT

A determination section 301 determines whether or not a DSCH has been assigned to the communication terminal apparatus in question, and outputs a signal indicating the result of that determination to a transmission controller 102, and the transmission controller 102 changes as appropriate the degree of frequency of transmission of a signal containing shared channel information according to the result of determination by the determination section 301. That is to say, the transmission controller 102 outputs a signal containing shared channel information to a modulator 103 with a high degree of frequency when the DSCH has been assigned to that terminal, and outputs a signal containing shared channel information to the modulator 103 with a low degree of frequency when the DSCH has not been assigned to that terminal.

4 Claims, 5 Drawing Sheets

U.S. PATENT DOCUMENTS

| | | | |
|---|---|---|---|
| 5,418,787 A | * | 5/1995 | Tiuraniemi et al. .......... 370/336 |
| 5,491,741 A | * | 2/1996 | Farwell et al. .............. 370/347 |
| 5,574,996 A | | 11/1996 | Raith |
| 5,678,192 A | | 10/1997 | Paavonen et al. |
| 5,694,391 A | * | 12/1997 | Diachina et al. ............ 370/346 |
| 5,778,319 A | | 7/1998 | Sawaki |
| 5,887,263 A | | 3/1999 | Ishii |
| 6,101,171 A | * | 8/2000 | Yoshida et al. ............. 370/280 |
| 6,236,855 B1 | * | 5/2001 | Austin ........................ 455/423 |
| 6,400,929 B1 | | 6/2002 | Ue et al. |
| 6,522,886 B1 | * | 2/2003 | Youngs et al. |
| 6,526,036 B1 | * | 2/2003 | Uchida et al. .............. 370/342 |
| 2001/0005378 A1 | | 6/2001 | Lee |
| 2002/0025815 A1 | | 2/2002 | Rune et al. |
| 2002/0077064 A1 | | 6/2002 | Ue et al. |
| 2002/0123349 A1 | | 9/2002 | Miyoshi et al. |
| 2002/0160781 A1 | | 10/2002 | Bark et al. |

OTHER PUBLICATIONS

"3rd Generation Partnership Project; Technical Specification Group Radio Access Network; Physical channels and mapping of transport channels onto physical channels (FDD)", (Release 1999), 3GTS 25.211 V3.2.0 (Mar. 2000), pp. 1–40.

W. Tamminen, et al.; 1XTREME, Motorola and Nokia, 3GPP2 TSG–S Meeting, Kyoto, Japan, Mar. 21, 2000, 7 sheets.

* cited by examiner

COMMUNICATION TERMINAL APPARATUS AND TRANSMISSION METHOD OF INFORMATION NECESSARY FOR COMMUNICATION USING A DOWNLINK SHARED CHANNEL (DSCH)

TECHNICAL FIELD

The present invention relates to a communication terminal apparatus, base station apparatus, and radio communication method for use in high-speed data communication.

BACKGROUND ART

One multiple access method in a digital radio communication system is CDMA (Code Division Multiple Access). In a standard established by 3GPP (3rd Generation Partnership Project), a standards body related to mobile radio communication systems, this CDMA method is used and a Downlink Shared Channel (DSCH) used for high-speed data communication in a downlink (a channel from a base station to a communication terminal) is stipulated as one channel shared by a plurality of communication terminals.

As this DSCH is used by being assigned to each communication terminal on a specified transmission unit basis (for example, on a frame-by-frame basis), its use is anticipated in downlink high-speed packet transmission, etc.

In high-speed packet transmission using a DSCH, a base station generally performs DSCH assignment to each communication terminal according to information indicating communication quality (such as the received SIR at each communication terminal, for example), information indicating the modulation/demodulation method, and so forth, in the event of DSCH assignment requests from communication terminals.

Also, since the above-described DSCH is assigned to communication terminals on a per-predetermined-transmission-unit basis, in high-speed packet transmission using a DSCH there are many cases in which packets to a particular communication terminal are transmitted dispersed time-wise.

A downlink channel for high-speed data communication shared by a plurality of communication terminals, as with a DSCH, is hereinafter referred to as a "shared channel", and information required during assignment of this shared channel or during communication using a shared channel is hereinafter referred to as "shared channel information".

However, in a conventional radio communication method, each communication terminal constantly transmits shared channel information to a base station regardless of whether or not there is a DSCH assignment request. Also, each communication terminal constantly transmits shared channel information to a base station even when the DSCH has not been assigned to that terminal.

When communication terminals constantly transmit shared channel information to a base station in this way, there are problems in that communication terminal power consumption increases, and in addition, interference imposed by a signal containing shared channel information on other signals increases in uplinks (channels from communication terminals to a base station). Moreover, the increase in interference results in a problem of reduced system capacity.

DISCLOSURE OF INVENTION

It is an object of the present invention to provide a communication terminal apparatus, base station apparatus, and radio communication method that enable communication terminal apparatus power consumption to be reduced, and also enable interference in uplinks to be reduced.

The present inventors arrived at the present invention by noting that there is a difference in the degree of frequency and content of shared channel information needed by a base station when a DSCH is either assigned or not.

That is to say, the present inventors arrived at the present invention by noting that a communication terminal to which a DSCH is assigned needs to constantly transmit shared channel information so that a base station can keep up with changes in propagation path conditions and changes in the modulation/demodulation method in real time and transmit the DSCH signal efficiently, whereas a communication terminal to which a DSCH is not assigned needs to only transmit shared channel information at the minimum degree of frequency necessary for DSCH assignment to be performed by the base station, and finding that a communication terminal to which the DSCH is not assigned can reduce the frequency of transmission of shared channel information.

Furthermore, the present inventors arrived at the present invention by noting that a communication terminal to which a DSCH is assigned needs to transmit all shared channel information including the modulation/demodulation method, and so forth, whereas a communication terminal to which a DSCH is not assigned needs to transmit, of shared channel information, only information necessary for DSCH assignment to be performed by the base station (information indicating communication quality, etc.), and finding that a communication terminal to which the DSCH is not assigned can reduce the amount of information in shared channel information.

Thus, in order to achieve the above object, the present invention changes as appropriate the degree of frequency of transmission and amount of information of shared channel information according to necessity at a base station, and transmits only the necessary amount of shared channel information according to the communication conditions between a communication terminal and a base station, thereby enabling the communication terminal power consumption to be reduced, and also enabling interference in uplinks to be reduced.

BEST MODE FOR CARRYING OUT THE INVENTION

With reference now to the accompanying drawings, embodiments of the present invention will be explained in detail below. In the following descriptions, a downlink channel for high-speed data communication shared by a plurality of communication terminals, as with a DSCH, is referred to as a "shared channel", and information needed for assignment of this shared channel and communication using the shared channel is referred to as "shared channel information". Shared channel information includes information indicating communication quality (for example, the received SIR of a communication terminal), base station selection information, information indicating the modulation/demodulation method according to propagation path conditions, information indicating the spreading ratio according to propagation path conditions, a receive packet number needed for retransmission control, and so forth.

Also, in the following descriptions a case is described where a DSCH is used as a shared channel, but this is not a limitation, and the following embodiments can also be implemented in a case where a channel other than a DSCH is used as a shared channel.

Embodiment 1

A communication terminal apparatus according to Embodiment 1 of the present invention changes the degree of frequency of transmission of shared channel information as appropriate according to whether or not there is a DSCH assignment request.

Figure 1:
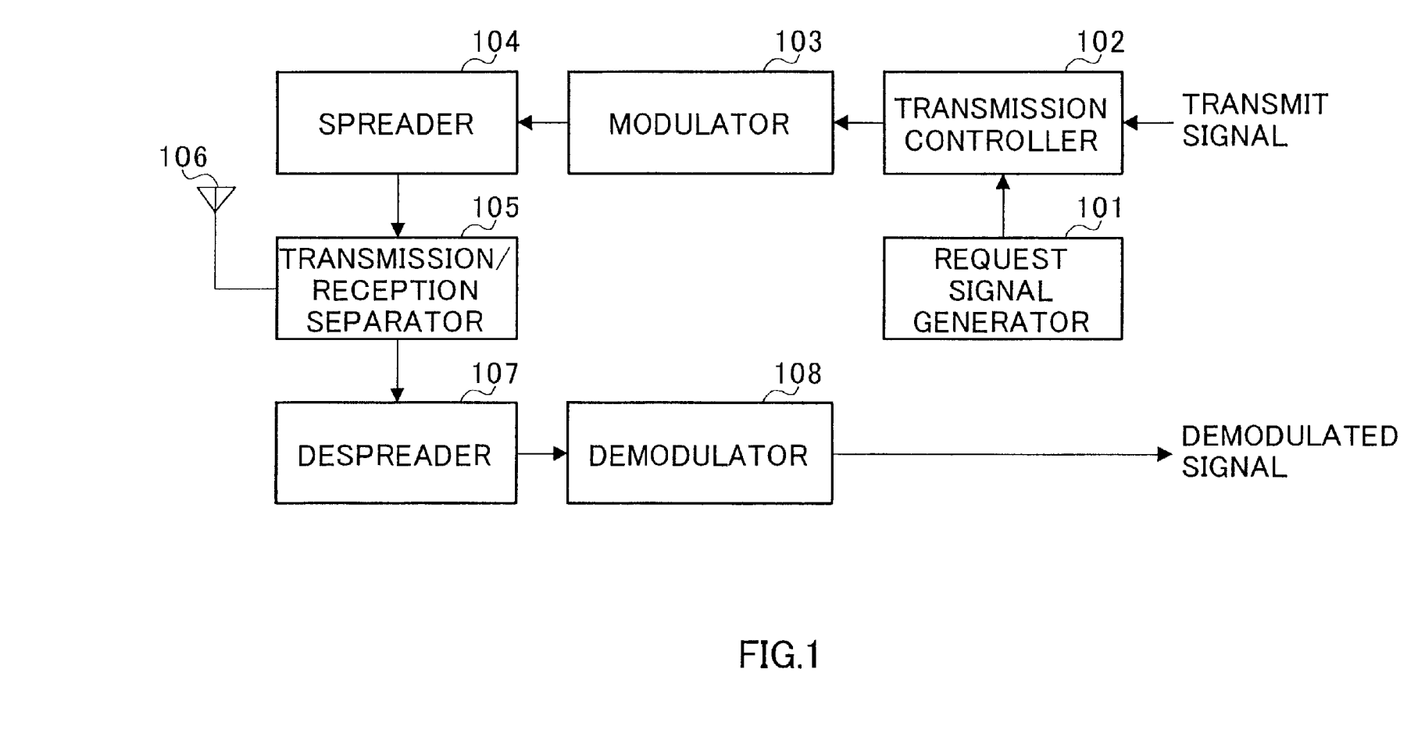
FIG. 1 is a main block diagram showing a schematic configuration of a communication terminal apparatus according to Embodiment 1 of the present invention.

FIG. 1 is a main block diagram showing a schematic configuration of a communication terminal apparatus according to Embodiment 1 of the present invention. In the communication terminal apparatus shown in FIG. 1, when a high-speed data (for example, high-speed packet) reception request is issued by a communication terminal user, a request signal generator 101 generates a signal (hereinafter referred to as "DSCH assignment request signal") for requesting DSCH assignment to that communication terminal apparatus by a base station apparatus. A transmission controller 102 changes the degree of frequency of transmission of a signal containing shared channel information.

A modulator 103 executes predetermined modulation processing on the transmit signal, and a spreader 104 executes predetermined spreading processing on the transmit signal. A transmission/reception separator 105 outputs the transmit signal to an antenna 106, and outputs a received signal to a despreader 107.

The despreader 107 executes predetermined despreading processing on the received signal, and a demodulator 108 executes predetermined demodulation processing on the received signal. By this means, a demodulated signal is obtained.

Figure 2:
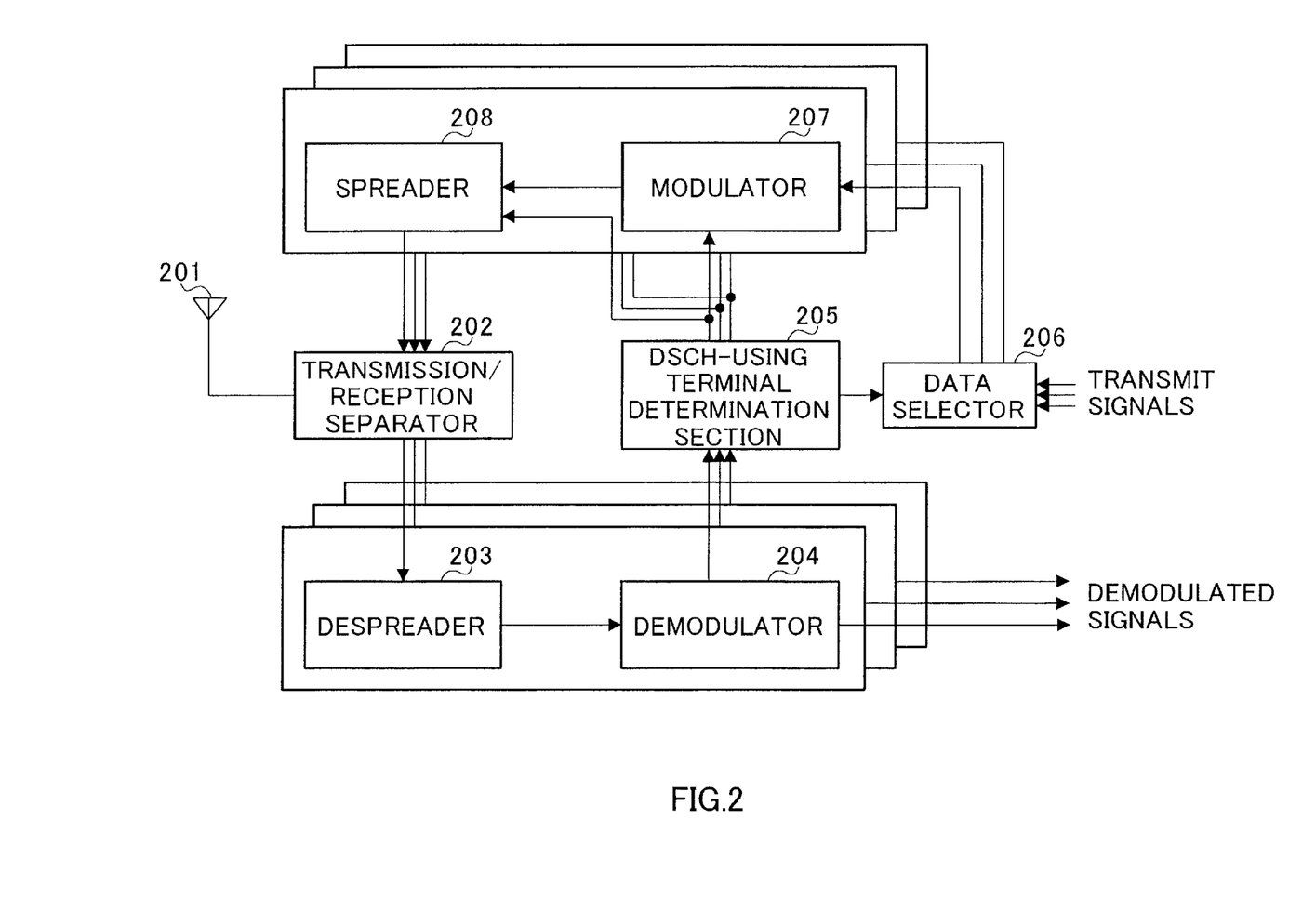
FIG. 2 is a main block diagram showing a schematic configuration of a base station apparatus according to Embodiment 1 of the present invention.

Next, the configuration of a base station apparatus that performs radio communication with the above communication terminal apparatus will be described. FIG. 2 is a main block diagram showing a schematic configuration of a base station apparatus according to Embodiment 1 of the present invention.

In the base station apparatus shown in FIG. 2, a transmission/reception separator 202 outputs a transmit signal to an antenna 201, and outputs a received signal to a despreader 203. The despreader 203 despreads the received signal with a despreading code corresponding to an individual communication terminal. A demodulator 204 executes predetermined demodulation processing on the received signal. By this means, a demodulated signal is obtained. A despreader 203 and demodulator 204 are provided corresponding to each communication terminal apparatus.

A DSCH-using terminal determination section 205 determines the communication terminal to which the DSCH is to be assigned according to shared channel information contained in the demodulated signal. A data selector 206 selects a signal for the communication terminal apparatus to which the DSCH has been assigned from a plurality of transmit signals.

A modulator 207 executes predetermined modulation processing on the transmit signal. A spreader 208 spreads the transmit signal with a spreading code corresponding to an individual communication terminal. A modulator 207 and spreader 208 are provided corresponding to each communication terminal apparatus.

Next, the operation of a communication terminal apparatus and base station apparatus with the above configurations will be described, again using FIG. 1 and FIG. 2.

In the communication terminal apparatus shown in FIG. 1, when a DSCH assignment request signal is output from the request signal generator 101, subsequent to output of the DSCH assignment request signal the transmission controller 102 outputs a signal containing shared channel information to the modulator 103 with a high degree of frequency. While a DSCH assignment request signal is not being output from the request signal generator 101, the transmission controller 102 outputs a signal containing shared channel information to the modulator 103 with a low degree of frequency. The DSCH assignment request signal is also output from the transmission controller 102 to the modulator 103.

"A low degree of frequency" here means the minimum degree of frequency of transmission necessary for DSCH assignment to be performed by the base station apparatus, and "a high degree of frequency" means a degree of frequency higher than the low degree of frequency, being a degree of frequency that enables high-speed data to be transmitted with the base station apparatus adequately keeping up with changes in the spreading ratio and modulation method when such changes are made by a communication terminal apparatus.

Specifically, when a DSCH assignment request signal is output, the transmission controller 102 subsequently outputs a signal containing shared channel information to the modulator 103 in each slot of a frame, for example, and while a DSCH assignment request signal is not being output, the transmission controller 102 outputs a signal containing shared channel information to the modulator 103 in only one slot of a frame. That is to say, when a DSCH assignment request signal is output, the transmission controller 102 subsequently outputs a signal containing shared channel information to the modulator 103 using a short period, and while a DSCH assignment request signal is not being output, the transmission controller 102 outputs a signal containing shared channel information to the modulator 103 using a longer period than the short period.

The signal containing shared channel information and the DSCH assignment request signal are transmitted to the base station apparatus using a dedicated communication channel.

In the base station apparatus shown in FIG. 2, the communication terminal to which the DSCH is to be assigned is determined by the DSCH-using terminal determination section 205 according to the signal containing shared channel information and the DSCH assignment request signal output from the demodulator 204. Then a signal indicating the communication terminal to which the DSCH has been assigned and a signal for notifying the communication terminal apparatus that the DSCH has been assigned are output to the data selector 206.

In the data selector 206, a signal for the communication terminal to which the DSCH has been assigned is selected from a plurality of transmit signals according to the signal indicating the communication terminal to which the DSCH has been assigned. The selected signal is output to the modulator 207, and is transmitted to the communication terminal apparatus using the DSCH. The signal for notifying the communication terminal apparatus that the DSCH has been assigned is output to the modulator 207, and is transmitted to the communication terminal apparatus using a dedicated communication channel.

For a signal to be transmitted using the DSCH, the DSCH-using terminal determination section 205 changes the modulation method and spreading ratio adaptively by controlling the modulator 207 and spreader 208 in accordance with shared channel information transmitted from the communication terminal to which the DSCH has been assigned.

Here, since a communication terminal apparatus that transmits a DSCH assignment request signal transmits shared channel information with a high degree of frequency, as described above, the base station apparatus can transmit signals using the DSCH, adequately keeping up with changes in the spreading ratio and modulation method by the communication terminal apparatus. Therefore, the base station apparatus can adaptively change the spreading ratio and modulation method of signals transmitted using the DSCH in accordance with changes of propagation path conditions.

Thus, according to a communication terminal apparatus of this embodiment, the degree of frequency of transmission of shared channel information is changed as appropriate according to whether or not there is a DSCH assignment request, and an interval is provided in which shared channel information is transmitted with a low degree of frequency, thereby enabling communication terminal power consumption to be reduced, and also enabling interference in uplinks to be reduced.

Embodiment 2

A communication terminal apparatus according to Embodiment 2 of the present invention has almost the same configuration as in Embodiment 1, differing in that the degree of frequency of transmission of shared channel information is changed as appropriate according to whether or not there is DSCH assignment to that terminal.

Figure 3:
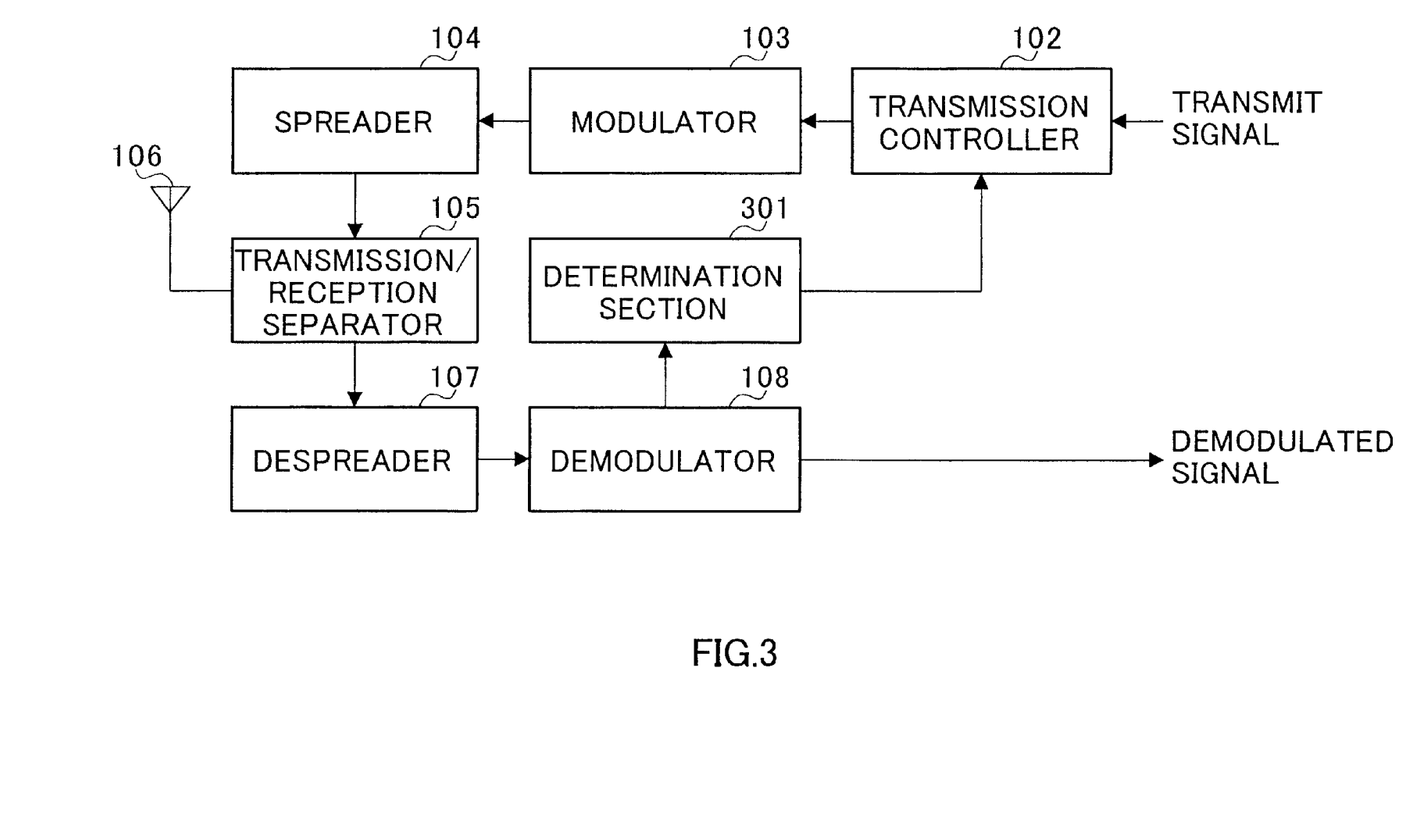
FIG. 3 is a main block diagram showing a schematic configuration of a communication terminal apparatus according to Embodiment 2 of the present invention.

FIG. 3 is a main block diagram showing a schematic configuration of a communication terminal apparatus according to Embodiment 2 of the present invention. Parts in FIG. 3 identical to those in Embodiment 1 are assigned the same codes as in Embodiment 1 and their detailed explanations are omitted.

In the communication terminal apparatus shown in FIG. 3, a determination section 301 determines whether or not the DSCH has been assigned to that terminal, and outputs a signal indicating the result of the determination to a transmission controller 102. Specifically, if a signal indicating that the DSCH has been assigned is included in the signal output from a demodulator 108, the determination section 301 determines that the DSCH has been assigned to that terminal, and if a signal indicating that the DSCH has been assigned is not included, the determination section 301 determines that the DSCH has not been assigned to that terminal.

The transmission controller 102 changes the degree of frequency of transmission of a signal containing shared channel information appropriately according to the result of the determination by the determination section 301. That is to say, the transmission controller 102 outputs a signal containing shared channel information to the modulator 103 with a high degree of frequency when the DSCH has been assigned to that communication terminal apparatus, and outputs a signal containing shared channel information to the modulator 103 with a low degree of frequency when the DSCH has not been assigned to that communication terminal apparatus.

Thus, according to a communication terminal apparatus of this embodiment, the degree of frequency of transmission of shared channel information is changed as appropriate according to whether or not there is DSCH assignment to the terminal in question, and an interval is provided in which shared channel information is transmitted with a low degree of frequency, thereby enabling communication terminal power consumption to be reduced, and also enabling interference in uplinks to be reduced.

Embodiment 3

A communication terminal apparatus according to Embodiment 3 of the present invention has almost the same configuration as in Embodiment 2, differing in that the degree of frequency of transmission of shared channel information is changed from a high degree of frequency to a low degree of frequency at the end of transmission of a signal transmitted to that terminal using a DSCH.

Figure 4:
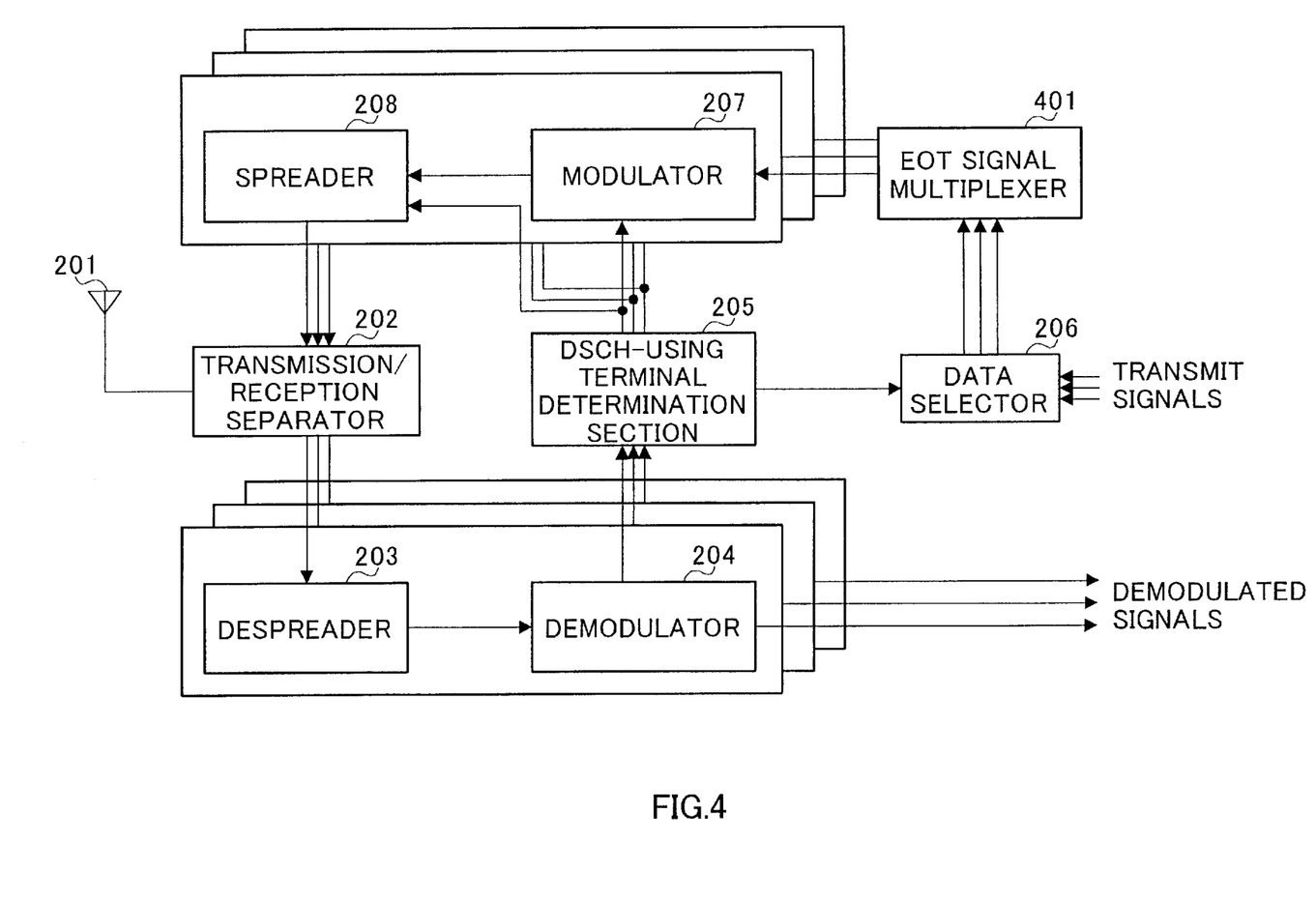
FIG. 4 is a main block diagram showing a schematic configuration of a base station apparatus according to Embodiment 3 of the present invention.

FIG. 4 is a main block diagram showing a schematic configuration of a base station apparatus according to Embodiment 3 of the present invention. Parts in FIG. 4 identical to those in Embodiment 1 are assigned the same codes as in Embodiment 1 and their detailed explanations are omitted.

In the base station apparatus shown in FIG. 4, an EOT (End Of Transmission) signal multiplexer 401 detects the end of a signal transmitted using the DSCH for each communication terminal apparatus that is a transmission destination, and multiplexes with that end signal a signal (hereinafter referred to as "EOT signal") indicating that this is the end of transmission. The signal with the EOT signal multiplexed is output to a modulator 207.

Figure 5:
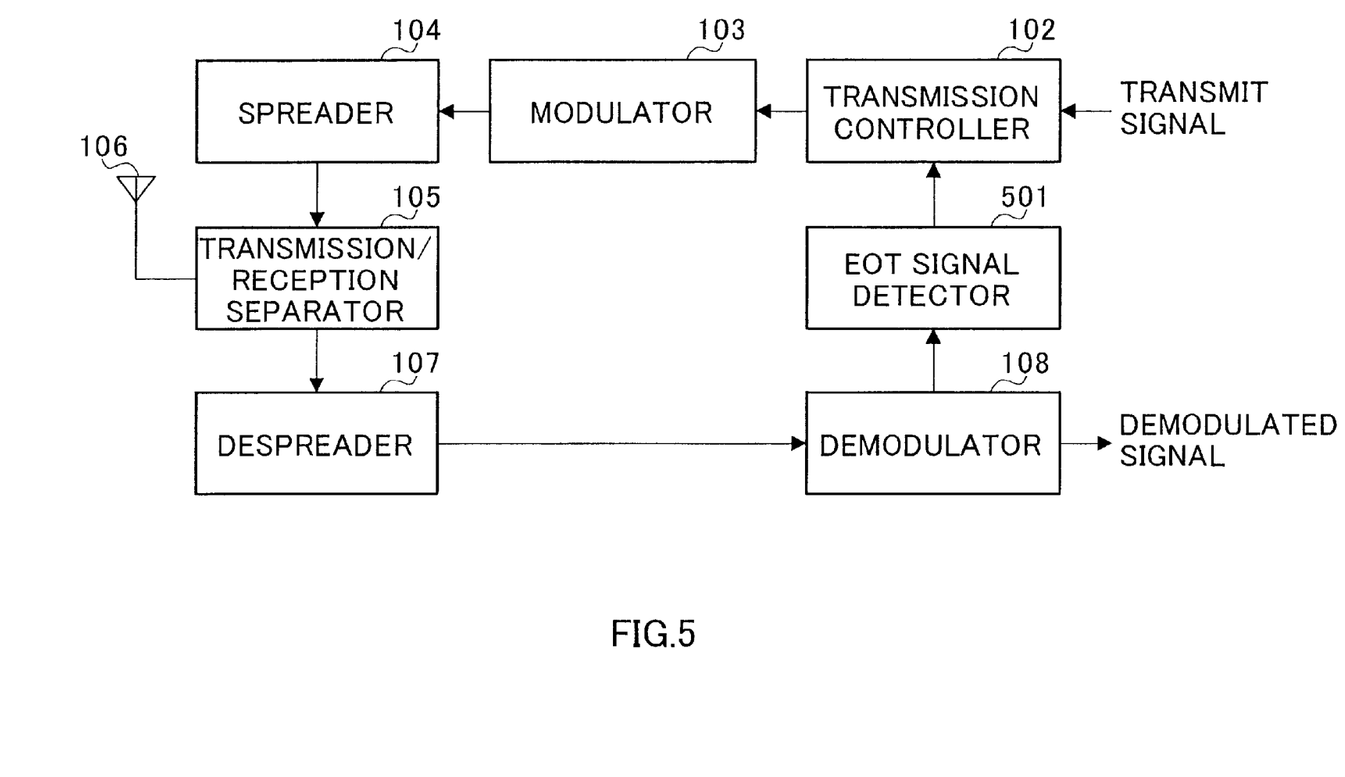
FIG. 5 is a main block diagram showing a schematic configuration of a communication terminal apparatus according to Embodiment 3 of the present invention.

Next, the configuration of a communication terminal apparatus that performs radio communication with the above-described base station apparatus will be described. FIG. 5 is a main block diagram showing a schematic configuration of a communication terminal apparatus according to Embodiment 3 of the present invention.

In the communication terminal apparatus shown in FIG. 5, an EOT signal detector 501 detects the end of a signal transmitted using the DSCH, and outputs a signal reporting detection of this signal to a transmission controller 102. Specifically, the EOT signal detector 501 detects the end of a signal transmitted using the DSCH by detecting an EOT signal multiplexed with the signal output from a demodulator 108.

When transmission of a signal transmitted to that terminal using the DSCH ends, the transmission controller 102 reduces the degree of frequency of transmission of a signal containing shared channel information. Specifically, in the interval until an EOT signal is detected, the transmission controller 102 outputs a signal containing shared channel information to a modulator 103 with a high degree of frequency, and after an EOT signal is detected, the transmission controller 102 outputs a signal containing shared channel information to the modulator 103 with a low degree of frequency.

Thus, according to a communication terminal apparatus of this embodiment, the degree of frequency of transmission of shared channel information is changed from a high degree of frequency to a low degree of frequency at the end of transmission of a signal transmitted to the terminal in question using a DSCH, and an interval is provided in which shared channel information is transmitted at a low degree of frequency, thereby enabling communication terminal power consumption to be reduced, and also enabling interference in uplinks to be reduced.

The present invention can also be implemented by combining above Embodiments 1 through 3 as appropriate. That is to say, a communication terminal apparatus can be simultaneously provided with two or three of the following: a request signal generator 101, a determination section 301, and an EOT signal detector 501.

Also, in above Embodiments 1 through 3, it is possible to change the amount of shared channel information instead of changing the degree of frequency of transmission of shared channel information. Specifically, when a DSCH assignment request occurs, when the DSCH has been assigned, and when an EOT signal has not been detected, all information included in shared channel information (information indicating communication quality, base station selection information, information indicating the modulation/demodulation method according to propagation path conditions, information indicating the spreading ratio according to propagation path conditions, a receive packet number necessary for retransmission control, and so forth) is transmitted, whereas when there is no DSCH assignment request, when the DSCH has not been assigned, and when an EOT signal is detected, of shared channel information, only the minimum information necessary for DSCH assignment (information indicating communication quality and base station selection information) is transmitted. By providing an interval in which the amount of information is changed and the amount of information is reduced in this way, also, communication terminal power consumption can be reduced, and interference in uplinks can also be reduced.

Furthermore, in above Embodiments 1 through 3, the example has been given of a radio communication system in which downlink high-speed data communication is performed using a DSCH, but this is not a limitation, and the present invention can be applied to any radio communication system in which a base station apparatus performs downlink high-speed data communication by determining shared channel assignment in accordance with shared channel information transmitted from a communication terminal apparatus.

As described above, according to the present invention it is possible to reduce communication terminal power consumption. Also, according to the present invention, it is possible to reduce interference in uplinks, and also to increase system capacity.

This application is based on Japanese Patent Application No. 2000-189410 filed on Jun. 23, 2000, entire content of which is expressly incorporated by reference herein.

INDUSTRIAL APPLICABILITY

The present invention is applicable to a radio communication system in which a base station apparatus performs downlink high-speed data communication by determining shared channel assignment in accordance with shared channel information transmitted from a communication terminal apparatus.

What is claimed is:

1. A communication terminal apparatus for use in a mobile communication system that performs data communication using a downlink shared channel that is shared by a plurality of communication terminal apparatuses and that is assigned to each of said plurality of communication terminal apparatuses on a per predetermined transmission unit basis by a base station apparatus, said communication terminal apparatus comprising:

a determiner that determines whether or not said downlink shared channel is assigned to said communication terminal apparatus based on a notification from the base station apparatus; and a transmitter that places information, which indicates communication quality and is necessary for data communication using said downlink shared channel, in a frame on an uplink dedicated channel, to provide said information to said base station apparatus, said frame comprising a plurality of slots, wherein said transmitter uses a slot of said plurality of slots to transmit said information after said downlink shared channel is assigned to said communication terminal apparatus, where said slot is not used to transmit said information when said downlink shared channel is not assigned to said communication terminal apparatus.

2. A communication terminal apparatus for use in a mobile communication system that performs data communication using a downlink shared channel that is shared by a plurality of communication terminal apparatuses and that is assigned to each of said plurality of communication terminal apparatuses on a per predetermined transmission unit basis by a base station apparatus, said communication terminal apparatus comprising:

a determiner that determines whether or not said downlink shared channel is assigned to said communication terminal apparatus based on a notification from the base station apparatus; and a transmitter that transmits information, which indicates communication quality and is necessary for data communication using said downlink shared channel, on an uplink dedicated channel to the base station apparatus, wherein said transmitter changes a period of transmitting said information between before and after said downlink shared channel is assigned to said communication terminal apparatus.

3. A communication terminal apparatus for use in a mobile communication system that performs data communication using a downlink shared channel that is shared by a plurality of communication terminal apparatuses and that is assigned to each of said plurality of communication terminal apparatuses on a per predetermined transmission unit basis by a base station apparatus, said communication terminal apparatus comprising:

a determiner that determines whether or not said downlink shared channel is assigned to said communication terminal apparatus based on a notification from the base station apparatus; and a transmitter that places information, which indicates a modulation method and is necessary for data communication using said downlink shared channel, in a frame on an uplink dedicated channel, to provide said information to said base station apparatus, said frame comprising a plurality of slots, wherein said transmitter uses a slot of said plurality of slots to transmit said information after said downlink shared channel is assigned to said communication terminal apparatus, where said slot is not used to transmit said information when said downlink shared channel is not assigned to said communication terminal apparatus.

4. A communication terminal apparatus for use in a mobile communication system that performs data communication using a downlink shared channel that is shared by a plurality of communication terminal apparatuses and that is assigned to each of said plurality of communication terminal apparatuses on a per predetermined transmission unit basis by a base station apparatus, said communication terminal apparatus comprising:

a determiner that determines whether or not said downlink shared channel is assigned to said communication terminal apparatus based on a notification from the base station apparatus; and a transmitter that transmits information, which indicates a modulation method and is necessary for data communication using said downlink shared channel, on an uplink dedicated channel to the base station apparatus, wherein said transmitter changes a period of transmitting said information between before and after said downlink shared channel is assigned to said communication terminal apparatus.

* * * * *